United States Patent [19]
Toman et al.

[11] 3,808,558
[45] Apr. 30, 1974

[54] METHOD AND APPARATUS FOR MODULATION SYNTHESIS

[75] Inventors: Donald J. Toman, Pleasantville; J. Roland Coulter, Harrison, both of N.Y.

[73] Assignee: Tull Aviation Corporation, Armonk, N.Y.

[22] Filed: Nov. 8, 1971

[21] Appl. No.: 196,288

[52] U.S. Cl.............. 332/9 R, 324/77 B, 332/23, 343/108 R
[51] Int. Cl............................. G01s 1/18, H03k 7/08
[58] Field of Search.......... 332/16, 16 T, 9, 9 T, 11, 332/11 D, 23; 343/106 R, 106 D, 107, 108 R, 108 M, 108 MS, 109; 324/77 B, 77 C

[56] References Cited
UNITED STATES PATENTS

| | | | |
|---|---|---|---|
| 3,189,902 | 6/1965 | Kintner | 343/107 X |
| 3,191,175 | 6/1965 | Battle et al. | 343/108 MX |
| 3,403,226 | 9/1968 | Wintringham | 332/11 X |
| 3,487,411 | 12/1969 | Toman | 343/108 R |

OTHER PUBLICATIONS

Mathews, "The Digital Computer as a Musical Instrument" — Science, Vol. 142, pp. 553–557, Nov. 1, 1963.

*Primary Examiner*—Alfred L. Brody
*Attorney, Agent, or Firm*—Curtis Ailes

[57] ABSTRACT

Digital sample point values signifying various modulation levels required at successive points in time are stored in a digital memory and read out in timed sequence and applied to modify a carrier wave in a manner such as to be recognized as modulation by a receiver.

16 Claims, 8 Drawing Figures

FIG. 5

METHOD AND APPARATUS FOR MODULATION SYNTHESIS

This invention relates to a method and apparatus for synthesizing the modulation for a radio carrier wave, the method and apparatus being particularly useful for electronic navigation systems and particularly for those used for aircraft.

In a number of applications of radio signals, and particularly in radio navigation systems, it is important to provide a constant depth of modulation (the percentage by which the modulation signal varies the apparent depth of the carrier wave). This requirement exists because the average carrier amplitude is used and recognized in the receiver as a basis for calibration of the receiver with respect to the information signals.

In navigation signal systems, particularly in systems such as instrument landing systems (ILS) where two modulating tone signals are employed and the relative amplitudes of the two tones are used to determine a course along a plane in space, another problem is that the two modulating signal tones must be absolutely locked in phase so that there is no "beat" frequency developed between these two modulating signals which would cause erratic operation of the navigation receiver instrument.

In order to achieve the objectives of a constant depth of modulation, and perfect phase lock of two modulating tone signals, it has been common in systems such as ILS systems, to employ a mechanical-electrical modulator. Such a modulator usually consists of an electric motor with metal vanes mounted for rotation upon the shaft of the motor and positioned to modulate the carrier by passing the vanes close to a section of the carrier transmission line to create controlled fluctuations in the carrier circuit impedance. That prior art method of modulation possesses a number of disadvantages including high cost, limited service life, and the maintenance problems associated with rotating mechanical equipment. Furthermore, while synchronous electric drive motors may be employed, the power system frequency may vary over short periods sufficiently to cause serious fluctuations in the modulation frequencies with resultant erratic results in the receivers.

Accordingly, it is one object of the invention to provide an improved modulation method and apparatus for providing a constant depth of modulation.

Another object of the invention is to provide an improved method and apparatus for producing modulation of a carrier by two tone signals which are absolutely phase locked without the use of mechanically rotating machinery.

Another object of the invention is to provide an improved method and apparatus for modulation in which there is a more accurate maintenance of the exact constant depth of modulation.

Another object of the invention is to provide an improved method and apparatus wherein it is possible to provide a combination of modulation by control values representative of two different signal tones in which the relative values of the two tones may be varied while accurately maintaining a constant depth of modulation by the combination of the two tones.

It has been proposed to provide navigation signal systems in which carrier wave signals are emitted from different angles and having different mixes of two different modulating tones at the different signal positions. The carrier signals from the different radiation positions forming a pattern which determines a particular navigation signal course.

The basic idea of providing a scanning beam radio transmitter for a radio instrument guidance system, such as for aircraft, in which the ratio of the respective amounts of modulation by two different modulation signals is varied as a function of the scanning, forms a portion of the subject matter described and claimed in a prior patent application Ser. No. 104,668 entitled "SCANNING BEAM GUIDANCE METHOD AND SYSTEM" filed on Jan. 7, 1971 by Donald J. Toman and Lloyd J. Perper and assigned to the same assignee as the present application.

It is another object of the present invention to provide an improved method and apparatus for producing the carrier signals having different mixes of modulating tones in which the modulating tones are perfectly synchronized for all of the different radiation positions and in which a constant depth of modulation is accurately maintained for the different mixes at the different radiation positions.

Another object of the invention is to provide a method and apparatus wherein it is relatively simple to provide for changes in the selection of different mixtures of the modulating signals at the different radiation positions.

Further objects and advantages of the invention will be apparent from the following description and the accompanying drawings.

In carrying out the invention there is provided a method for synthesizing the production of a modulated radio carrier wave comprising digitally storing a plurality of different sample point values signifying various modulation levels required at successive points in time, reading out said sample point values in timed sequence, applying said point values to modify a carrier wave in said timed sequence to produce a modified carrier, the modifications of the carrier being such as to be recognized as modulation by a receiver.

Figure 3:
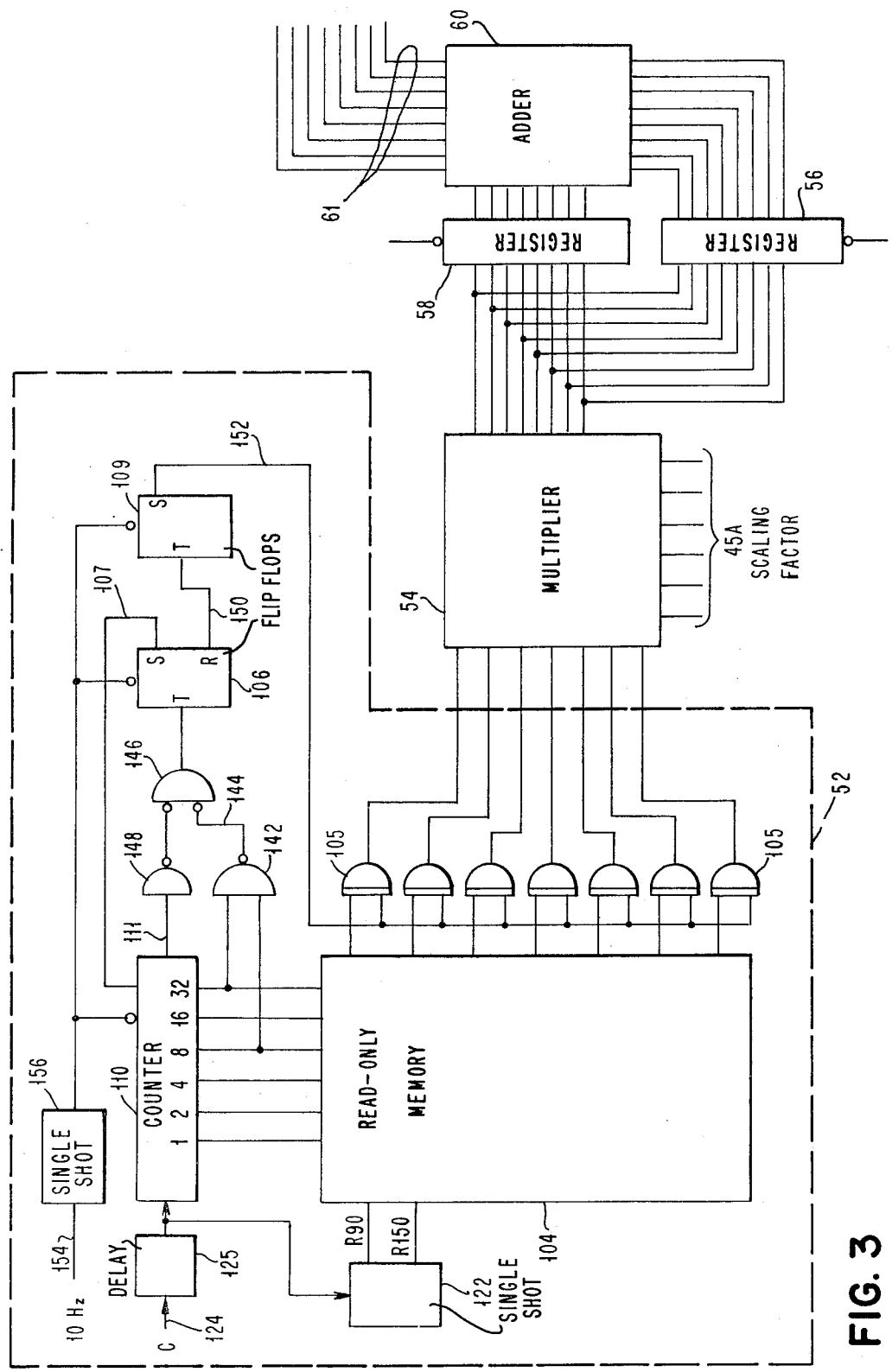
FIG. 3 is a more detailed schematic circuit diagram of another portion of the system of FIG. 1 illustrating a read only memory for providing modulation sample point values, and a multiplier and an adder for modifying those values.
Figure 4:
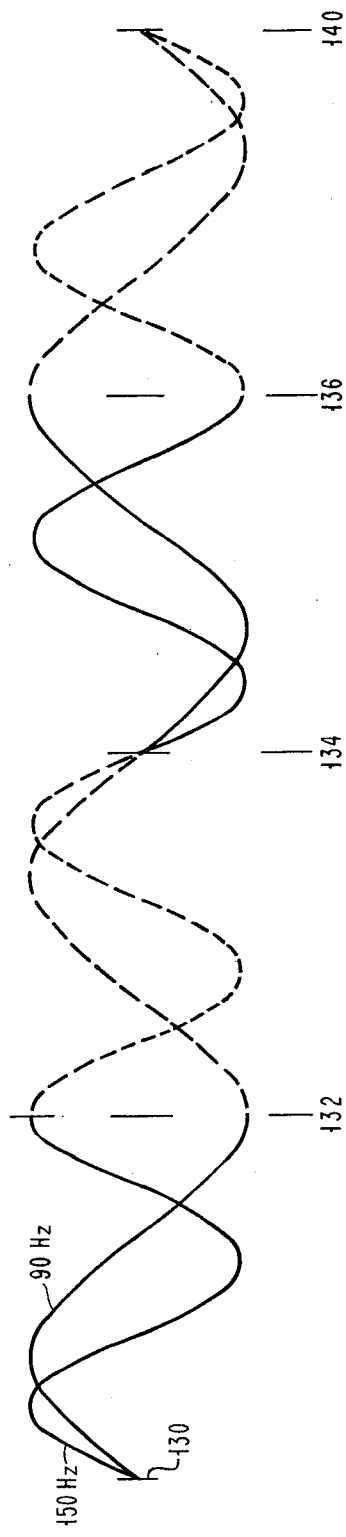

FIG. 4 comprises a waveform diagram illustrating the mode of operation of the portion of the system illustrated in FIG. 3.

Figure 1:
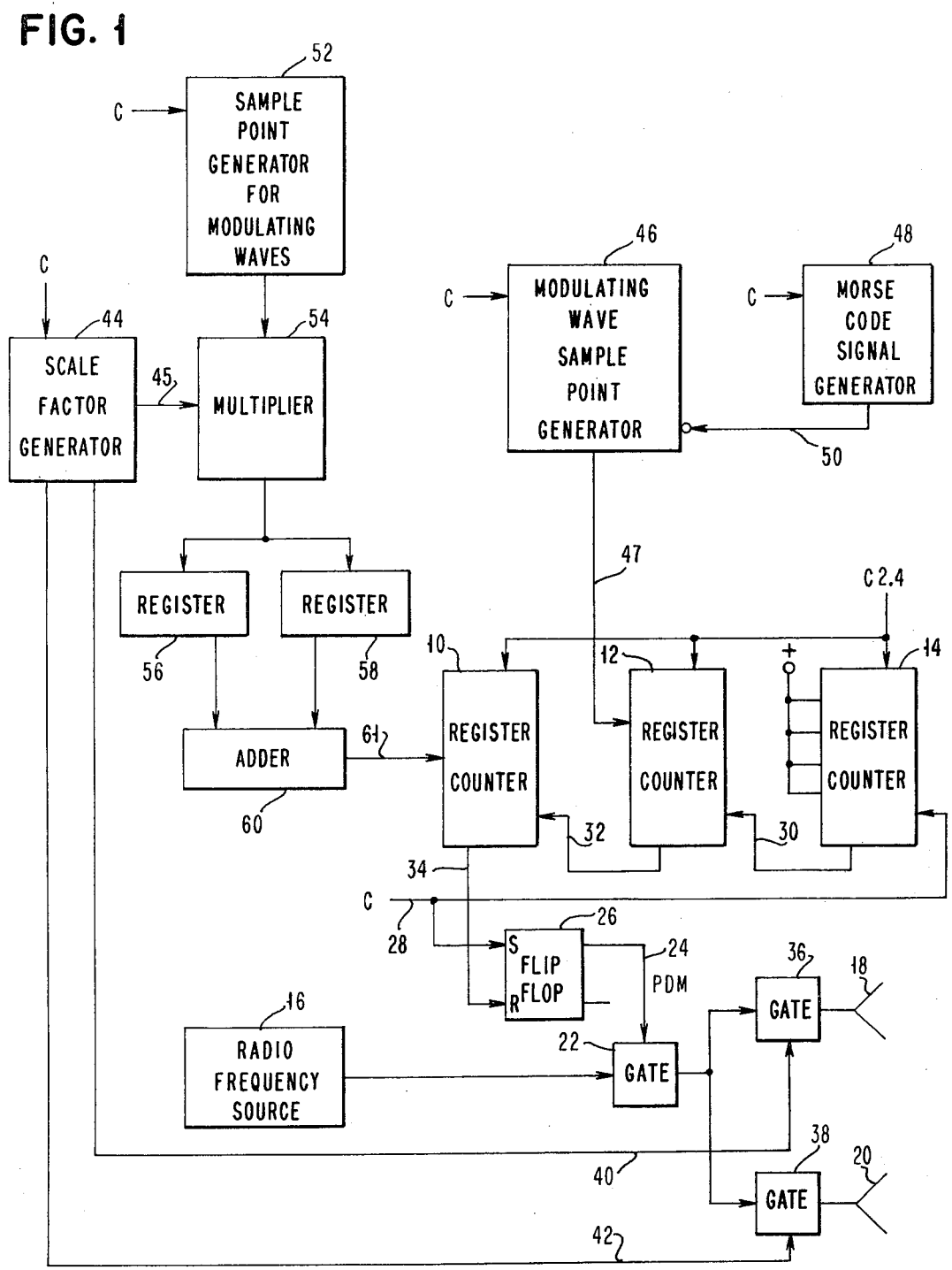
FIG. 1 is a simplified schematic diagram of a preferred system which may be employed in carrying out the present invention.
Figure 5:
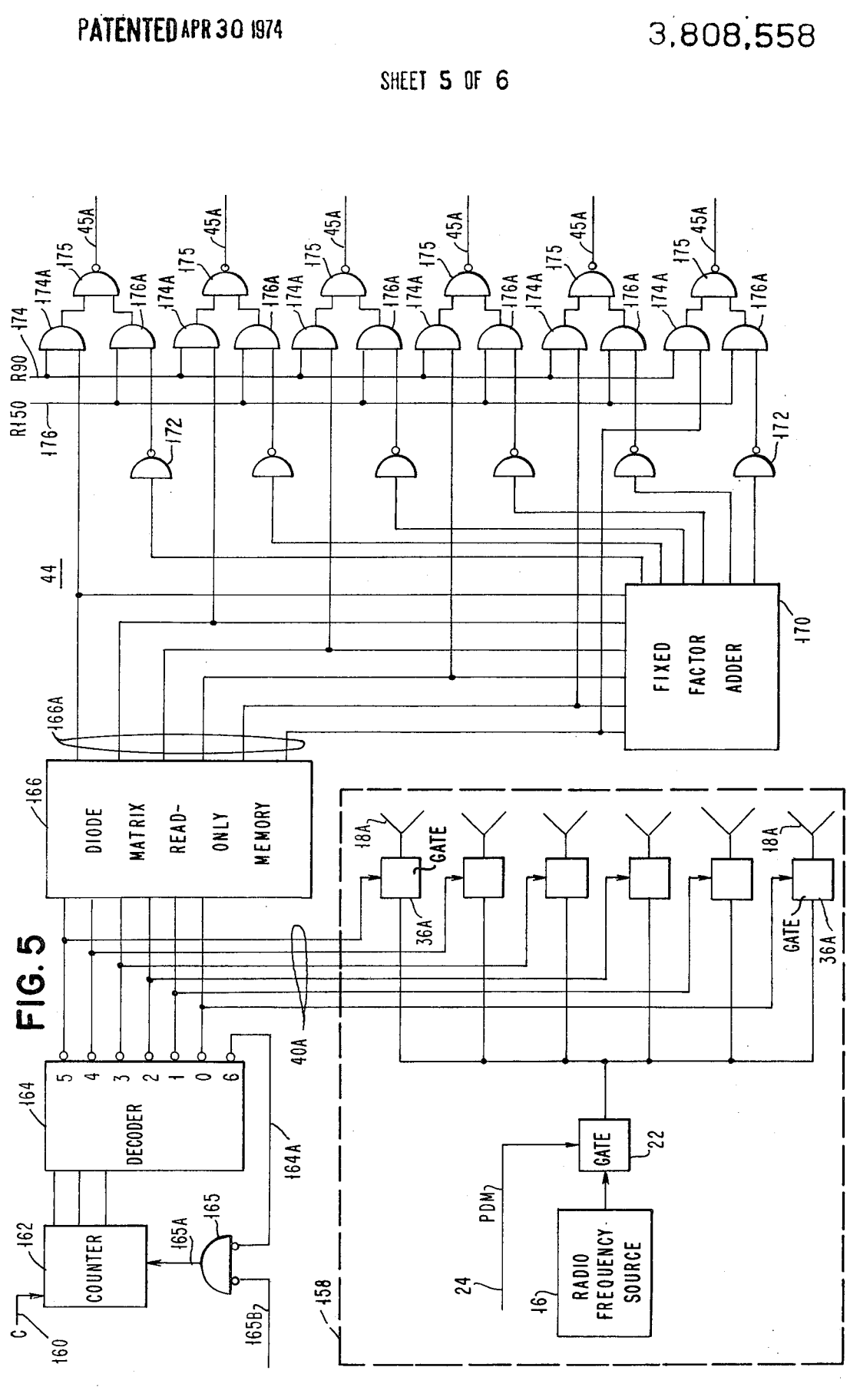

FIG. 5 is a detailed schematic circuit diagram of the portions of the system of FIG. 1 including a scale factor generator and final switching arrangements for the carrier wave outputs.

Figure 6:
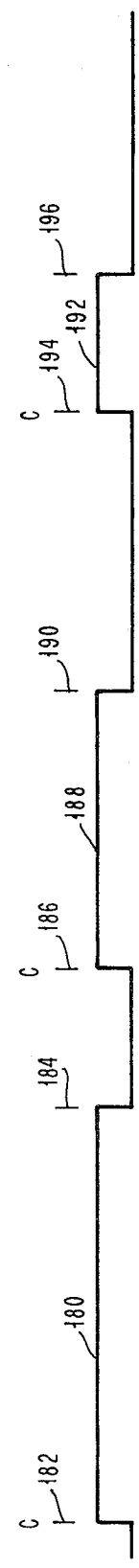

FIG. 6 is a timing diagram presenting a simplified representation of a pulse duration modulated output of a preferred embodiment of the invention.

Figure 7:
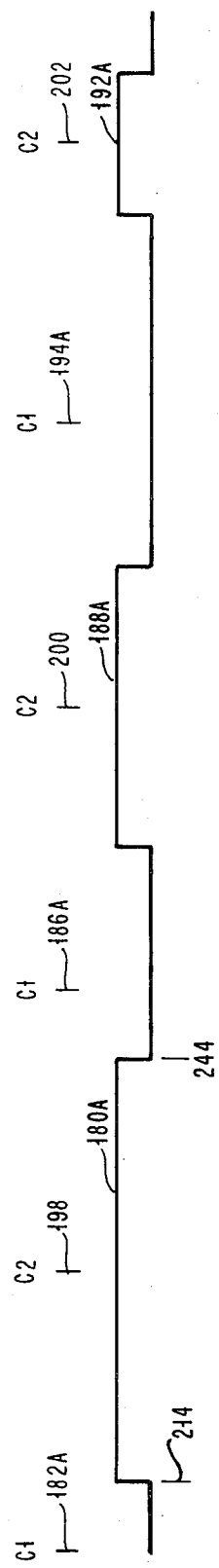
Figure 8:
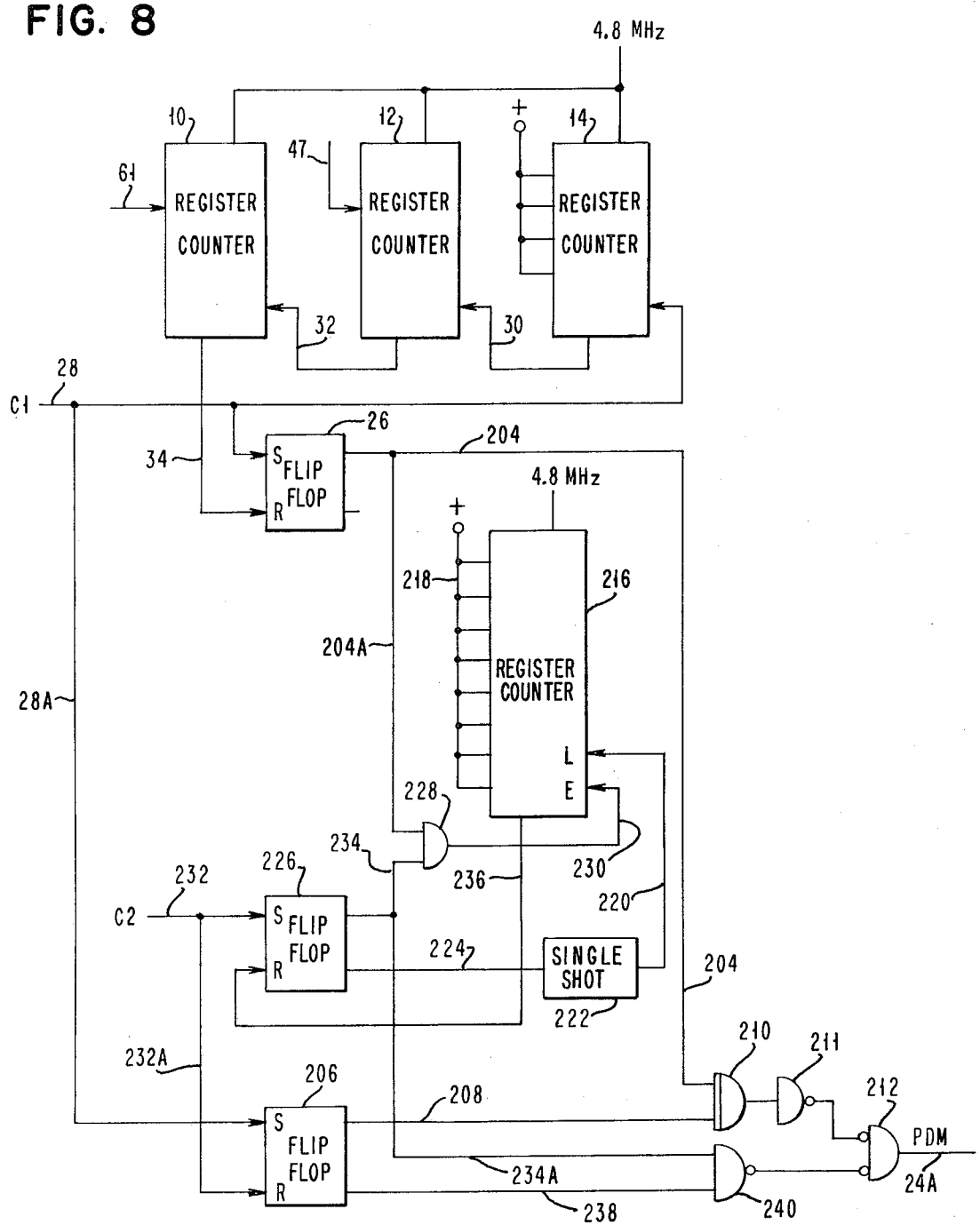

FIG. 7 is a timing diagram presenting a simplified representation of a pulse duration modulated output of an alternative embodiment of the invention as illustrated in FIG. 8.

And FIG. 8 illustrates an alternative embodiment of the apparatus which is capable of producing waveforms in which the leading edge, as well as the trailing edge, of the carrier pulse is controlled to introduce the modulation signals.

Referring more particularly to FIG. 1, digital sample point values are successively stored in the combination of registers 10, 12, and 14. These three registers may sometimes be hereinafter referred to as constituting a single register since the total of the digital values stored in these three registers is used to modify the signal emitted from a radio frequency source 16 before the radio frequency energy is radiated from antennas 18 and 20.

In the preferred form of this apparatus, the registers 10, 12, and 14 are in the form of register-counters, and they control the radio frequency energy by gating that energy through a digital gating device 22 in bursts of radio frequency energy. The duration of each burst is determined on the basis of the sample point value stored in the registers 10, 12, and 14. The gate 22 is opened, or enabled, by an enabling connection 24 from a flip-flop 26 when that flip-flop is set by a clock signal C on the set in-put connection 28. As the gate 22 is opened by the clock signal C, the clock signal is also supplied to commence a count down of the register counter 14. When the register counter 14 is counted down to 0, a consequent 0 output is carried by a connection 30 to commence the count down operation of the register-counter 12. When that register-counter counts down to 0, there is a consequent output on connection 32 to commence the count down of register-counter 10. Finally, when the register-counter 10 counts down to zero, the resultant output on a connection 34 resets the flip-flop 26, disabling the carrier gate 22 and ending the burst of carrier energy. Thus, the length of the burst of carrier energy is determined by the sum of the digital values initially stored in register-counters 10, 12, and 14.

Successive bursts of carrier energy controlled by successive sample point values may be switched in an alternating sequence to the different antenna elements 18 and 20 by means of gates 36 and 38 controlled by signals on lines 40 and 42 obtained from a scale factor generator circuit 44 which will be described more fully below. In the preferred embodiments of the invention, four to six or more of the antenna elements 18 and 20 may be provided which serve to set up a so-called "scanning beam" pattern. This arrangement is more fully described below in connection with FIG. 5. Only two antennas are illustrated in FIG. 1 in order to simplify the initial presentation of the overall system. By coordinating the commutation of the carrier signal bursts by the gates 36 and 38 with the switching by gate 22 determining the length of individual bursts, it is possible to provide a very neat, simple, and economical method for producing a scanning beam from a single radio frequency source 16.

In a preferred form of the invention, the limit of the depth of modulation is effectively determined by providing for the storage of a predetermined fixed number in the register-counter 14 in every cycle of operation. This represents a fixed minimum value for transmission of the radio frequency wave for each sample point. The depth of modulation is also determined by the maximum range of combined sample point count values stored in register-counters 10 and 12.

In the register-counter 12, the successive sample points which are stored represent different points suggesting the presence of of a tone signal wave obtained on connection 47 from a modulating wave sample point generator 46. The generator 46 constitutes basically a digital memory which stores the different values of the sample points and which is addressed to deliver the different sample points successively in response to successive sample rate clock signals C. The details of the sample point generator are shown and described in connection with FIG. 2 below. Information is added to the signals from the sample point generator supplied to register-counter 12 by means of a Morse code signal generator 48. Through a connection 50, the Morse code signal generator starts and stops the modulating wave sample point generator 46 to thereby add Morse code signals to the tone resulting from the different sample points supplied by generator 46. In a navigation control system, the combination of Morse code signals supplied by the Morse code signal generator may be repeated continuously to identify the particular station from which the navigation signals are being supplied.

Varying sample point count values are also supplied to the register-counter 10 by a combination of circuit elements including a sample point generator 52, the scale factor generator 44, a multiplier 54, registers 56 and 58, and an adder circuit 60. These components, exclusive of the scale factor generator 44, are shown and described more fully below in connection with FIG. 3. The details of the scale factor generator are shown more fully in FIG. 5 and described in connection with that figure.

The sample point generator 52 comprises essentially a read only memory which is capable of providing digital numbers signifying sample point values for two or more signal waves. In a preferred form of the invention which is employed for an instrument landing system, these sample point values preferably represent 90 and 150 Hz waves. In a typical operation of the system, a sample point value for one wave, such as the 90 Hz wave, is first supplied from the generator 52 to the multiplier 54. Concurrently a scale factor is supplied from the scale factor generator 44 at connection 45 to the multiplier 54 indicating what proportion of the modulation to be controlled by the number stored in register-counter 10 is to be representative of the 90 Hz wave. The multiplier 54 then multiplies the sample point obtained from generator 52 by the scale factor obtained from scale factor generator 44 and stores the resultant number in register 56. In the same cycle of operation, the sample point generator 52 next supplies a sample point number representative of a point value of the other one of the modulating waves, such as the 150 Hz wave, to the multiplier 54. Concurrently, the scale factor generator 44 provides to the multiplier a scale factor representing a complement of the value previously supplied to the multiplier 54 to indicate the proportion of the modulation to be stored in register-counter 10 which is to be attributable to the 150 Hz wave. The result of that multiplication is stored in the register 58. The numbers stored in the registers 56 and 58 are then added in the digital adder 60 and the sum is supplied on connection 61 and stored in the register-counter 10. The timing of the operations of the system is such that all of the computations just described for the 90 Hz and 150 Hz sample point values can be carried out for each value to be stored in register-counter 10 while the fixed count register-counter 14 is counting down in the initial stages of the operation for the corresponding point.

The scale factor generator 44 typically provides different sets of scale factors respectively for determining the modulation sample point values for the signals to be delivered on the different antennas 18 and 20. Thus, the delivery of scale factor values by generator 44 is coordinated with the delivery by that generator of antenna selection gating signals on lines 40 and 42. If a change is desired in the mixtures of the 90 and 150 Hz modulation signals supplied on the different antenna elements 18 and 20, then it is necessary only to change the scale factors supplied from the scale factor generator, and every other part of the system remains the same as before.

Figure 2:
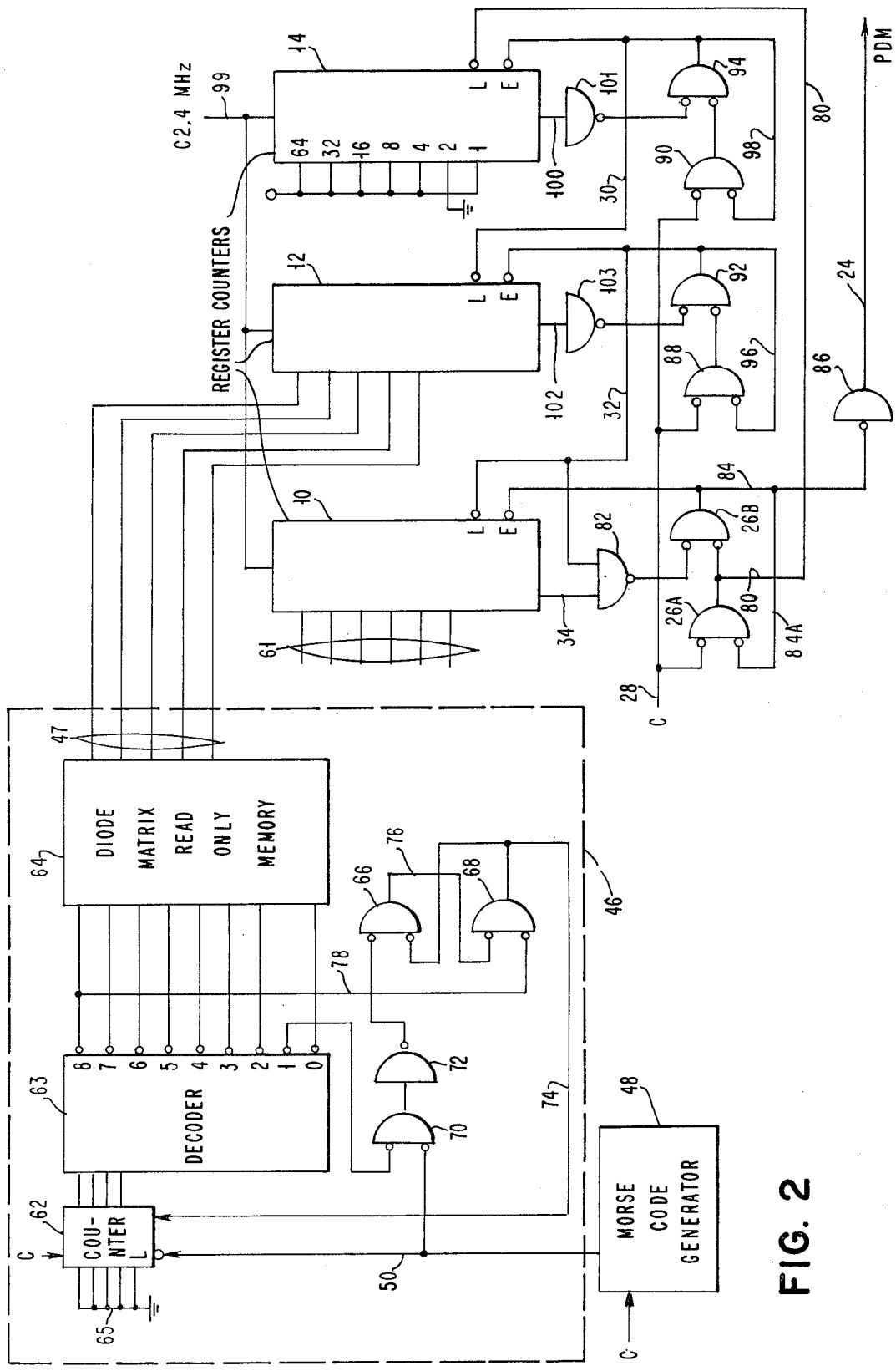
FIG. 2 is a more detailed schematic circuit diagram of a portion of the system of FIG. 1 including an identification signal generator and a portion of the system which provides a pulse duration modulation signal output.

FIG. 2 shows the details of a preferred embodiment of the portion of the system illustrated in FIG. 1 including the modulating sample point generator 46, the Morse code generator 48, the register-counters 10, 12, and 14, the flip-flop 26, and the gates and circuitry associated therewith.

As previously mentioned above, the Morse code information generated by the Morse code generator 48 may be continuously repetitive in nature for the purpose of identifying the transmitter from which the signals are being sent. Accordingly, the Morse code generator 48 and the modulating wave sample point generator 46 may be jointly identified herein as an identification code generator. When the Morse code signals are completely repetitive in nature, the Morse code generator may include a read-only memory for remembering the exact code employed with the particular transmitter. The Morse code generator emits signals on connection 50 to sample point generator 46. Within generator 46, this signal goes to a "load-inhibit" input connection "L" to an address counter 62. The counter 62 is a binary counter operating at the basic sampling rate in response to clock pulses C. It provides its output count signals to a decoder 63. Unit 63 decodes the binary count signals from counter 62 into individual signals on a plurality of output lines labelled zero through eight, most of which are connected to a diode matrix read-only memory 64. The signals from the decoder 63 are in a "one out of n" mode. That is, there is only one signal on one output line for each binary signal combination into the decoder 63. As indicated by the small circle symbols in the diagram, these are logic 0 signals. This means that the output connections of decoder 63 are otherwise at logic 1.

The diode matrix read-only memory 64 is operable to provide sampling points representing different values in the sine wave for the identification tone which is to be added into the output signal. These values are represented in binary form by combinations of signals on the output lines 47. These values are provided at the sampling rate to the register-counter 12 to control the portion of the modulation containing the identification signal.

When the Morse code generator 48 is off (between Morse code pulses), a ground potential (logic zero) is provided on connection 50 to the load-inhibit input L to the counter 62. This causes the counter 62 to be reset to a count of zero by loading in logic 0 signals at the input connections 65. Furthermore, as long as the signal at the load-inhibit connection L remains at logic 0, the counter 62 remains at a zero count and is inhibited from counting up or down in response to sampling rate clock signals received at the upper clock input C. Accordingly, as 0 logic value is continuously provided under these conditions to the decoder 63 so that a zero output is provided from the decoder 63 on the bottommost output line to the diode matrix 64. In response to this input, the diode matrix provides a number on the output lines 47 corresponding to the middle value in the range of values representing the different sampling points for the identification tone. Thus, if the tone is represented by sampling points having values from zero to fifty-two, the number provided on connections 47 from matrix 64 in response to the zero input is twenty-six. This properly represents no modulation whatever. However, when the Morse code generator 48 turns on, providing a logic 1 output at 50, the counter 62 is no longer inhibited and it immediately commences to count upwardly in response to successive sample rate clock pulses at connection C. This results in the switching of the successive sampling points through the decoder 63 and the diode matrix 64 to provide various sampling point values on connections 47 to the register-counter 12. The number 1 output from the decoder 63 does not lead to the diode matrix 64 because this corresponds to a zero output at the output lines 47, a result for which the diode matrix 64 requires no input. The count continues upwardly until it reaches the condition for an 8 output from the decoder 63. This represents the maximum sample value at the outputs 47 from the diode matrix 64, and it is a turn-around point in the generation of the sine wave. Accordingly, the counter is reversed at this point and counts back down to one at which point it again reverses, this process being repeated as long as the tone is on. With a maximum output value of 52, as previously suggested, that maximum is available when the output from decoder 63 is on the eight line.

The count up and count down action of the counter 62 is controlled by a combination of NAND gates 66, 68, and 70, and the inverter 72 which provide an up-down count control signal on connection 74. When this signal is at logic 0 the counter 62 counts up, but when it is logic 1, the counter 62 counts down. The NAND gates such as 66, 68, and 70 operate on the rule that if either one or both inputs are a logic 0, there is a logic 1 output. Only if both inputs are logic 1 is there a logic 0 output. When the output from the Morse code generator 48 is a logic 0 (identification tone off), this condition is detected at connection 50 by NAND gate 70 to provide a logic 1 output to the inverter 72, causing the inverter 72 to provide a logic 0 output to NAND gate 66. This causes a logic 1 output on connection 76 to the upper input of NAND gate 68. The other (lower) input to NAND gate 68 is also supplied with a logic 1 input under these conditions because all of the outputs of the coder 63 are at logic 1 except when a particular count is selected corresponding to that output line. Since this sequence was commenced with the stipulation that the Morse code generator 48 is turned off, the decoder 63 is held at the 0 output condition. Accordingly, the NAND gate 68 has one inputs at both of its input connections resulting in a logic 0 output at the output connection 74. This logic 0 signal is supplied as a control signal to the counter 62 and causes the counter 62 to count upwardly as soon as the Morse code generator 48 provides an enable signal on the control line 50. The logic 0 output from NAND gate 68 is also supplied to the lower input of NAND gate 66 to maintain a logic 1 output from that NAND gate until NAND gate 68 is switched.

Whenever the counter 62 is switched on by the Morse code generator 48, it counts upwardly until the count of eight is achieved. At that point, a logic zero signal is provided from the decoder 8 output 78 to the lower input of NAND gate 68, causing that gate to switch to provide a logic 1 output on connection 74 to reverse the counter. Furthermore, the logic 1 output is supplied from the output of NAND gate 68 to the lower input of NAND gate 66. A logic 1 output is also supplied to the upper input connection of NAND gate 66 so that a logic 0 output appears at 76 as an input to hold NAND gate 68 with a one output to count the counter down until the count of one is achieved. The logic 1 on the upper input of NAND gate 66 is supplied from NAND gate 70 and inverter 72. Logic 1 inputs are being supplied to both of the input connections of NAND gate 70, one of these being the counter enable signal on connection 50, and the other being the logic 1 output from the number one output connection from decoder 63. Thus, NAND gate 70 provides a logic 0 output to inverter 72 resulting in a logic one output to NAND gate 66. This condition continues until the counter counts down to the one count, at which time the number 1 output from decoder 63 goes to logic 0, switching the output from NAND gate 70 to logic 1 and the output from inverter 72 to logic 0, and thus shifting the states of NAND gates 66 and 68 as previously described to provide a logic 0 upcount signal on connection 74 to the counter 62. Thus, as long as the counter 62 is enabled by the Morse code generator 48, the counter continues to count up to eight and down to one and up to eight again and continuously repeats these cycles. It will be appreciated that by reason of this arrangement, it is only necessary to store sample values corresponding to one-half cycle of a sine wave in the read-only memory 64. One-half cycle of the sine wave is thus generated as the counter 62 counts up, and the complementary half cycle is generated as the counter 62 counts down, and then the sequence is repeated for the generation of successive sine wave cycles.

As previously explained in connection with FIG. 1, the digital values supplied on connections 47 to the register-counter 12 are combined with the count value stored in the register-counters 10 and 14 to provide a single sample point value for the control of modulation. In addition to the code controlled tone signal sample stored in register counter 12, a fixed number is stored in register 14, and a navigation signal sample may be stored in register 10.

The operation of the portion of the circuit including the counters 10, 12, and 14 is commenced by the receipt of a basic sampling rate clock pulse C on connection 28. This is a negative going (logic zero) pulse. In this more detailed embodiment, the function of the flip-flop 26 of FIG. 1 is fulfilled by a pair of NAND gates 26A and 26B. The logic 0 pulse on connection 28 actuates the upper input of the NAND gate 26A to provide a logic 1 output at connection 80 to NAND gate 26B. NAND gate 26B is also, at this time, receiving a logic 1 output from a NAND gate 82 so that the result is a logic 0 output at connection 84. That logic 0 signal is inverted in an inverter 86 to provide a logic 1 output at 24 which is sustained until all of the counters count down to zero. This is the basic pulse duration modulation (PDM) signal.

The logic 0 output on connection 84 is also connected to an enable input E of register-counter 10 to permit the operation of that counter whenever the load L input goes to logic 1. The logic 0 output at connection 84 is also carried by a feedback loop 84A to one of the inputs of NAND gate 26A to maintain the operation of that gate to thereby maintain a logic 1 output on connection 80. That logic 1 signal is carried to the load L input connection of the register-counter 14 to cause the count down operation of that counter to begin. Prior to this time, the load L terminal of register-counter 14 is maintained at logic 0, causing the register to be loaded with a fixed number in accordance with the permanently wired input connections shown to the left of the counter. The input connections as shown correspond to a fixed input value of 125.

In a manner similar to that just described for gates 26A and 26B, the sample rate clock signal C on connection 28 switches NAND gates 88 and 90, providing logic 1 outputs to the respective NAND gates 92 and 94, and causing each of those NAND gates to provide logic 0 outputs to respectively enable the counter-registers 12 and 14 at the E inputs thereof. The outputs from 92 and 94 are also provided respectively through feedback connections 96 and 98 to maintain the NAND gates 88 and 90 in the logic 1 output state. The logic 0 signals from gates 92 and 94 are also supplied through connections 30 and 32 to the load L inputs of register-counters 10 and 12 respectively to prevent counter operation and to permit loading of those counters. The counter 14 is then counted down by means of a 2.4 MHz clock signal received at connection 99. While register-counter 14 is being counted down, the sample modulation quantities are being computed and stored in the register-counters 10 and 12.

As soon as register-counter 14 has counted down to zero, it provides a logic 1 signal at an output connection 100 which is inverted in an inverter 101 and supplied to NAND gate 94 to switch that gate to provide a logic 1 output on connection 98. The result is that a logic 1 signal is supplied to the enable input connection E of register-counter 14, disabling that counter. The logic 1 output is also supplied through connection 30 to the load input connection L of counter 12 to enable that counter to commence its down count operation. Prior to this instant of time, the sample value for the identification tone signal at connections 47 has been stored in the register-counter 12 while register-counter 14 was counting down.

As soon as the register-counter 12 counts down to zero, it provides a 1 output of connection 102 to an inverter 103 which consequently supplies a logic 0 output to the upper input of gate 92 causing the gate to emit a logic 1 output. That signal is supplied to the enable E input of register 12 to disable that register. It is also supplied through connection 32 to the load L input control connection of register-counter 10 to cause that counter to begin its down count. The navigation signal sample has been computed and stored in the register 10 while register-counter 14 was counting down. Thus, the count down of register-counter 10 starts immediately upon the completion of the count down of register-counter 12. Upon the completion of the count down of register-counter 10, a resultant zero signal is emitted as a logic 1 at connection 34 to NAND gate 82. The NAND gate 82 provides an AND function of this signal with the logic 1 signal on connection 32 to provide a logic 0 output to gate 26B. It is necessary to provide this AND function because a false operation could occur in those instances where the computed value originally stored in register-counter 10 is zero. In that case, if a simple inverter were provided at gate 82, the system would turn off as soon as the computed zero value was stored in register-counter 10, and before the completion of the counts of register-counters 12 and 14.

The logic 0 output from NAND gate 82 causes a shift of the state of gate 26B, providing a logic 1 output at connection 84. This disables the counter 10 and terminates the PDM signal on output connection 24 derived through inverter 86. The logic 1 signal at 84 is also supplied through the feedback connection 84A to the lower input of NAND gate 26A, and by this time the input from the beam rate clock pulse connection 28 is also a logic 1. With two logic 1 inputs, the gate 26A supplies a logic 0 output to connection 80 which is provided to the load L input connection of the fixed register-counter 14 to reset that counter to the loaded fixed value so that it is ready for the beginning of the next sample cycle of operation.

FIG. 3 illustrates in more detail a schematic circuit diagram of the portion of FIG. 1 including the sample point generator 52, the multiplier 54, the registers 56 and 58, and the adder 60. The apparatus comprising the sample point generator 52 is enclosed within the dotted box identified as 52 in FIG. 3. This apparatus includes a read-only memory 104 from which the sample values for the 90 and 150 Hz signal waves are obtained. Particular sample values are selected from the memory 104 by means of an address counter 110, and are read out through exclusive OR circuits 105 to the multiplier 54. Each sample is multiplied in the multiplier 54 by a scaling factor received on a second set of multiplier inputs 45A. The resultant products are stored in the registers 56 and 58, register 56 storing the 90 cycle sample value for a particular point, and register 58 storing the 150 cycle sample value for that same point. These sample values are added together to obtain a sample sum for that point in adder 60, and the sum value, represented in binary coded digital form, is available on the adder output lines 61 for storage in register-counter 10 previously described in FIG. 2.

While separate read-only memories could be provided for the 90 and 150 Hz samples, in the preferred form of the invention, a single read-only memory 104 is employed for both of these functions. The 90 and 150 Hz samples are stored at different memory addresses, and the shift from 90 Hz samples to 150 Hz samples is accomplished by a monostable multivibrator circuit indicated at 122. The separate sampling points are selected by the counter 110 by advancing the counter 110 by means of clock signals C supplied at 124 through a delay circuit 125. The clock signals are designated as C since they correspond to the rate of the basic sampling rate clock signal C. Upon the occurrence of each clock signal C, the monostable multivibrator circuit 122 also receives the delayed signal from the delay circuit 125 to provide an output first on the R90 address line to the read-only memory 104, and then to the R150 output to the read-only memory 104 to first select the 90 Hz wave sample and then the 150 Hz wave sample for the particular numerical address then stored in the counter 110.

In the preferred form of the invention, the read-only memory 104 stores sample values corresponding to only three-quarters of a cycle of the 90 Hz wave and one and one-quarter cycles of the 150 Hz wave. The portions of the waves of these two frequencies stored in the read-only memory are illustrated graphically in FIG. 4 between the origin point 130 and point 132. The manner in which these sample values stored in the read-only memory 104 are read out and employed to construct complete and continuing 90 and 150 Hz waves is as follows: The counter 110 is caused to count upwardly from zero to forty to read out all of the sample values corresponding to the portions of the curves shown in FIG. 4 between the points 130 and 132. At that point, associated logic circuitry causes the counter 110 to start counting down, and the sample values in memory are again read out to produce sample values in reverse order and to thereby produce the dotted portions of the curves as represented between point 132 and point 134 in FIG. 4. At point 134, the logic circuitry causes the counter 110 to again reverse in its operation and it again commences to count upwardly to the value forty. However, other logic circuitry associated with the counter 110 and the memory 104, and with the exclusive OR circuits 105, causes the sample values to be read out in complement form starting from point 134. This causes the generation of the curve portions between points 134 and 136 in FIG. 4. The curve sections between points 134 and 136 are the exact inverse of the curve sections between points 130 and 132. When the count of forty is achieved in the counter 110, the reversing logic circuitry is again effective to reverse the counter while maintaining the read-out of inverse values from memory 104 to generate the sample values corresponding to the curves shown between points 136 and 140 in FIG. 4. At this point, a full five cycles of the 150 Hz wave have been generated and a full three cycles of the 90 Hz wave have been generated. The sequence of operations of the counter and the associated control circuitry is then repeated so that the entire sequence of curves shown in FIG. 4 is repeated again and again to produce continuous 90 and 150 Hz waves.

By separately storing and separately reading out different sample values for the 90 and 150 Hz waves, those waves may be multiplied in the multiplier 54 by different scaling factors applied at connections 45A to provide different mixes of amplitudes of the 90 and 150 Hz waves. The scaling factors are generated in a circuit illustrated in FIG. 5 and described below in connection with that figure.

The logic circuits for providing the reversals of counter 110, and the shift from direct to inverse value read-outs from memory 104, include a logic NAND circuit 142 which is connected to the appropriate outputs of the digital counter 110 to detect the achievement of a count of forty. This results in a logic zero output at connection 144 providing a zero input to the NAND gate 146. That results in a logic 1 output from gate 146 to the trigger input T of a flip-flop 106. This puts a high, or logic 1, signal on the set output S of flip-flop 106 at connection 107 which is connected back to the counter 110 and controls the counter to cause it to count down. When the count down is completed, and the counter 110 registers zero, the counter then causes a logic 1 output at the special output connection 111 to an inverter 148. This provides a logic 0 input to NAND gate 146 providing another logic 1 trigger signal to the flip-flop 106 to reset that flip-flop and to remove the count down signal from connection 107. This again causes the counter 110 to count upwardly until the NAND gate 142 is again energized. However, when the second triggering of flip-flop 106 occurs, at the time the count down operation is completed, a reset output is provided at a reset output R connection 150 to the trigger input T of a reciprocal control flip-flop 109. This sets flip-flop 109 and provides an output on connection 152 to control the exclusive OR circuits 105 so that the reciprocal of the values read from the read-only memory 104 is supplied to the multiplier 54. The point where the flip-flop 106 resets to again commence the upward count, and the flip-flop 109 sets to commence the read out of reciprocal values corresponds to the point 134 in the graphical representation of FIG. 4.

At the point 136 in FIG. 4, the NAND gate 142 is again effective to detect the full count condition, and the flip-flop 106 sets to cause counter 110 to count down without altering the reciprocal read-out controlled by flip-flop 109. This is the phase of operation shown between points 136 and 140 in FIG. 4. When the counter again counts down to zero and flip-flop 106 is again triggered to the reset condition, the output on connection 150 triggers the reciprocal flip-flop 109 to reset that flip-flop so that the system again begins the upward count and the direct (not reciprocal) read-out to produce the portions of the curves as illustrated between points 130 and 132 in FIG. 4. Thus, the system continues to cycle and read-out the memory 104 in four different modes.

In order to make absolutely certain that the portion of the system represented in this figure remains synchronized with the other portions of the system, a synchronizing signal at a 10 Hz rate is supplied at 154 through a single shot (monostable multivibrator) circuit 156 to provide a reset signal to the counter 110, and to each of the flip-flops 106 and 109. This provides a proper restart for each of these circuits if there has been a failure to maintain synchronism for any reason.

By storing and reading out separately the sample values for the 90 Hz and 150 Hz waves, the relative proportions or mix of these two waves used to modulate the carrier can be varied at will by providing different scaling factors with respect to the different waves at the scaling factor input connections 45A to the multiplier 50. Accordingly, each sample value for the 90 Hz wave is first multiplied by its appropriate scale factor in the multiplier 54, and the product is stored in the register 56. Subsequently, upon the read-out of the corresponding 150 Hz wave sample, it is multiplied by another scaling factor in multiplier 54, and the product is stored in register 58. The operations of the multiplier, and the storage gating signals for the registers 56 and 58 may be timed by timing signals R90 and R150 derived from the single shot 122 controlling the read-out of the separate sample points for the 90 and 150 Hz sample points from memory 104. The two products stored in registers 56 and 58 are then added in the binary adder 60 to obtain a composite sample point value which is supplied through connections 61 to the register-counter 10 previously described in connection with FIGS. 1 and 2.

Referring to FIG. 5, a preferred, and more elaborate, form of the antenna array such as that including antenna 18 in FIG. 1, and associated gates, is shown within the dotted box 158. The six antennas shown there are all designated 18A. All of the remainder of FIG. 5 relates to details of a preferred form of the scale factor generator 44 of the system of FIG. 1.

As shown in FIG. 5, the scaling factor generator 44 includes a binary counter 162 which responds to clock signals C supplied at connection 160 at the sampling rate to provide individual beam switching signals. The binary count values are supplied to a decoder circuit 164 which converts the digital count values into individual beam switching signals consisting of a sequence of successive logic 0 signals on each of the six lines labeled zero through five at the right side of the decoder 164. After the output on decoder output line five, the next subsequent upward count of the counter 162 causes an output from decoder line six indicated at 164A. This output is supplied as one of the inputs to a NAND gate 165, turning that gate on and supplying a logic 1 output on connection 165A to immediately reset counter 162. This causes zero outputs from the counter to the decoder 164 and therefore resets the decoder to provide a zero output. While the operation of gate 165 and the resetting of the counter 162 and coder 164 obviously takes some time, the operation is so rapid that the delay is negligible between the appearance of the six output from decoder 164 and the subsequent resulting zero output from decoder 164. The counter 162 may also be reset by an independent reset signal supplied from another source on input connection 165B to gate 165.

The periodic beam switching outputs from decoder 164 supplied on connections 40A may be used as commutating signals to actually gate the transmitter outputs to the individual separate scanning beam antennas 18A as described more fully below in connection with circuit 158. These signals are also supplied to a read-only memory 166 which may be composed of a diode matrix. The memory 166 stores, and is capable of emitting upon command, a six digit binary number representing the proportion of the total signal which is to be composed of 90 Hz wave to be provided to each antenna in response to the commutation signal for that particular antenna. These six binary digit signals appear on the output connections 166A. During the interval when the 90 Hz amplitude signal is available on outputs 166A, there is a subinterval during which an R90 timing signal is available on a connection 174. This R90 signal is supplied to a series of AND gates 174A to gate through the six digit binary number from connection 166A to NAND gates 175, and thus to output lines 45A. The signals on lines 45A are referred to as multiplier signals (as well as scaling factor signals) since they are supplied to the multiplier circuit described above in connection with FIG. 3.

In a later sub-interval of the interval during which the 90 Hz signal scale factor number appears on the memory output connections 166A, a complement switching gate signal, sometimes referred to herein as the R150 timing signal appears on connection 176. This gates complement values of the 90 Hz scale quantity through AND gates 176A and NAND gates 175 to the same output lines 45A. The complement values are derived by the combination of an adder circuit 170 and inverter circuits 172. The R90 and R150 timing signals on connections 174 and 176 may be obtained directly or indirectly from the R90 and R150 outputs of the single shot circuit 122 described above in connection with FIG. 3.

In the preferred form of this invention which is intended to be employed for navigation signals for an instrument landing system, the total maximum navigation signal modulation in the system design has a fixed value of 50. This means that if, on a particular antenna element, all of the modulation is to be 90 Hz modulation, then the binary coded number on output connections 166A for that particular antenna would correspond to the number 50, and the complement value, signifying the amplitude of the 150 Hz signal would be zero. However, the six digit binary output on lines 166A is capable of indicating count values from zero through sixty-three, and only with a count of sixty-three is the complement value exactly zero. Accordingly, in order to provide the correct complement value, the circuit 170 is provided to add a fixed factor of thirteen to the output from matrix 166 before complementing in the inverters 172. By this means, it is assured that this circuit always provides a scaling factor value for the 150 Hz signal achieved by the complement operation which, when summed with the corresponding 90 Hz scaling factor results in a sum of exactly fifty.

In a preferred embodiment, in which the modulation is carried out by pulse duration modulation in a scanning beam system, the final output circuits by means of which the radio frequency carrier wave is modulated and switched to the different antenna elements may be carried out as shown in FIG. 5, within the dotted box 158. As shown there, the radio frequency signal obtained from radio frequency source schematically illustrated at 16 is gated on and off by means of a gating circuit 22 in response to the pulse duration modulation (PDM) signal obtained from the circuitry previously described and appearing on connection 24. In this manner, a series of bursts of carrier wave are supplied to the antennas, the combined and integrated lengths of the samples provided by the different carrier bursts is seen and detected by the receiver as modulation information. The separate pulse duration modulation bursts of carrier energy are sequentially transmitted through a common connection 178 to the separate antenna elements 18A. The sequence of transmission is controlled by the commutating signals appearing on connections 40A from the commutation counter 162 and the decoder 164 and supplied to individual antenna switching gates 36A.

As an alternative method of switching, the PDM switch 22 may be omitted, and the PDM signal may be used to gate the commutating signals by separate gates inserted in the commutating control lines 40A. As another alternative, the gates 36A may be three input AND or NAND gates, and the PDM signal from connection 24 may be connected to each of those gates. Thus, an output to a particular antenna 18A would require the concurrence of the presence of the radio frequency wave from source 16, the PDM gating signal from connection 24, and the particular beam commutating signal on the associated connection 40A.

In a typical pattern of operation of the circuit of FIG. 5, the scaling factors provided on output lines 45A for the 90 and 150 Hz waves, and for generating signals from the different antennas in the antenna array may be as shown in the following table:

| | 90 Hz Scale Factor | 150 Hz Scale Factor |
|---|---|---|
| First (outside antenna 18A) | 50 | 0 |
| Second antenna | 40 | 10 |
| Third antenna | 25 | 25 |
| Fourth antenna | 25 | 25 |
| Fifth antenna | 10 | 40 |
| Sixth (outside) antenna | 0 | 50 |

It is apparent from the above description that the basic objectives of the invention are achieved by the preferred form of the invention described above. Thus, the depth of modulation is maintained at a constant value. This is determined by the fixed minimum and maximum widths of the pulse duration modulation signal. The minimum width is determined by the fixed number which is stored in the register-counter 14. The maximum width is determined by the maximum values stored in counters 10 and 12. Furthermore, it is very clear that an absolute phase lock between the 90 Hz and 150 Hz waves is achieved since the corresponding sample points for those waves are read out in perfectly phase locked relationship from the read-only memory 104 of FIG. 3, as described above in connection with FIGS. 3 and 4. Thus, while it is conceivable that there could be slight variations in the clock frequencies which control the operations of the circuits, there can never be any phase drift between the 90 and 150 Hz waves and thus no beat frequencies are created by a lack of a phase locked condition.

While systems in accordance with the present invention may be operated at various clock frequencies, in one satisfactory example of the preferred embodiment of the invention, as described above, a basic clock frequency C which was employed was 4.8 kilo-Hz (KHz). With this basic clock frequency, a satisfactory count down clock frequency for the registers 10, 12, and 14 was 2.4 MHz. This was much more than adequate to assure that there would be a complete count down of the combination of register-counters 10, 12, and 14 during one interval of the basic clock sampling frequency of 4.8 KHz.

In one practical embodiment of the invention as described above, the total values stored in the register-counters 10, 12, and 14 are as shown in the following table:

EXAMPLE OF CONTENTS OF THE THREE COUNTERS 10, 12, AND 14

| | Minimum Value | Midpoint Value | Maximum Value |
|---|---|---|---|
| Fixed value register counter 14 | 125 | 125 | 125 |
| Identification tone register-counter 12 | 0 | 25 | 50 |
| Navigation signal register-counter 10 | 0 | 100 | 200 |
| Totals | 125 | 250 | 375 |

With the basic sample rate clock frequency signals C at 4.8 KHz, and with a counting down clock frequency for the register-counters 10, 12, and 14 of 2.4 MHz, it is apparent that there is sufficient time for 500 cycles of the count down pulses at 2.4 MHz for each sampling rate clock pulse at 4.8 KHz. Accordingly, the above stored numbers fit nicely within the 500 count cycles per sampling pulse limit, with a number of cycles left over for resetting and restarting the system. Furthermore, a reasonably high effective duty cycle is provided despite the interruptions of the carrier transmission, for the carrier is on for an average of fifty percent of the time, represented by the relationship of the number 250 with relation to the number 500, and never for less than twenty-five percent of the time, represented by the minimum total register contents of 125.

The maximum "on" period is 75 percent represented by the maximum total storage value of 375 in relation to the total of 500. When these values are used, it is apparent that the operation of the register-counters (considered together) is perfectly symmetrical about the midpoint value of 250. Accordingly, the output (PDM) signal from these circuits on connection 24 can be inverted and the end result is the same. With such an inversion, the radio frequency source is switched off at gate 22 for individual periods determined by the total counts stored in the register-counters, rather than switched on for total periods determined by those counts. With either mode of operation, it is obvious that the depth of modulation is a constant 50 percent, 40 percent navigation signal and 10 percent identification tone signal.

Following the above reasoning, with the inverted PDM output, it is also possible to easily increase the duty cycle by having the carrier switched on for longer periods during each sample pulse initiated cycle of system operation. For instance, by storing a minimum count of 50 in the register-counter 14, an average total count of 200 in the register-counters 10, 12, and 14, and a maximum total count of 350, the load cycle is raised to the point where the average "on" time corresponds to 300 counts (60 percent of the time) rather than 250 counts (50 percent of the time). Since the system switching associated with reloading of the register-counters 10, 12, and 14 is at least commenced while the PDM signal is on, this increased duty cycle does not reduce the time available for the set up switching. Notice that the fixed count and the variable counts are all adjusted to maintain the constant 50 percent modulation.

In the system as thus far described, the pulse duration modulation is carried out in a mode such that the pulse of carrier wave always begins upon the initiation of a sample pulse clock signal C, and the variation in the duration of the pulse of carrier wave is controlled entirely by the time of cutoff. This mode of operation is illustrated in FIG. 6.

In FIG. 6, the pulse illustrated at 180 is initiated by the clock pulse C occurring at point 182, and is ended at the time the register-counters 10, 12, and 14 are completely counted down, at a point in time indicated at 184. This point is illustrated as three quarters of the time period to the next clock pulse C shown at 186. In the preferred embodiment of the invention as described above, this would correspond to the maximum count storage of 375 in the combination of register-counters 10, 12, and 14. The next pulse indicated at 188 is then started at time point 186 and ends at time point 190. This is illustrated as a pulse which lasts for one half of the normal period between successive clock pulses C and corresponding to a total storage count of 250 in the combination of register-counters 10, 12, and 14. A third successive pulse is indicated at 192, beginning at the third clock pulse C at point 194, and continuing for a short interval to point 196. As illustrated, this pulse has the minimum width corresponding to the minimum count of 125 in the register-counters 10, 12, 14. The successive pulses of the modulated carrier normally do not vary nearly as much as the pulses 180, 188, and 192 illustrated in FIG. 6. The changes in pulse width are normally much more gradual than this from one pulse to the next. However, pulses of drastically different widths are illustrated in FIG. 6 for the purpose of illustrating a mode of modulation in which only the trailing edge of the pulse is controlled to insert the modulation information. While this mode of pulse duration modulation is not ideal, because of the normally gradual changes in pulse duration it is usually acceptable for most purposes, and particularly for the purpose of navigation control systems such as ILS systems. It has been determined that the receivers recognize the variation in pulse length as imparting the intended modulation information. Because of the nature of the carrier pulse, with the leading edge fixed by the clock, and the trailing edge controlled by the modulation information, the net result is an apparent slight phase shift with changes in pulse duration (amplitude). The higher harmonics of the tone are phase rather than amplitude modulated.

FIG. 7 illustrates a more idealized pulse duration modulation signal pattern in which the carrier pulses are controlled by controlling both the beginning and the ending of the pulse, time-centering each pulse about a clock signal C2 illustrated at points 198, 200, and 202. FIG. 7 employs the same horizontal time scale as used in FIG. 6, and the three carrier pulses 180A, 188A, and 192A illustrated in FIG. 7 are of exactly the same duration as the corresponding pulses 180, 188, and 192 of FIG. 6. In FIG. 7, clock signals C1 are shown as occurring at points 182A, 186A, and 194A corresponding to the clock C points 182, 186, and 194 in FIG. 6. The C2 clock pulses in FIG. 7 at points 198, 200, and 202 occur at exactly the same frequency as the C1 clock pulses, but are exactly 180 degrees out of phase with the C1 clock pulses. Thus, each sample time interval (from C1 at 182A to C1 at 186A) is divided into a first timing interval (from C1 at 182A to C2 at 198) and a second timing interval (from C2 at 198 to C1 at 186A).

FIG. 8 illustrates a modification of the apparatus of FIG. 1 which is capable of producing the waveforms of FIG. 7 in which the leading edge, as well as the trailing edge, of the carrier pulse is controlled to introduce the modulation signals. In the system of FIG. 8, the registers 10, 12, and 14 correspond exactly to those registers as they appear in the apparatus of FIG. 1. Furthermore, the apparatus connected to those registers for computing and loading numbers into those register-counters is intended to be present in the system of FIG. 8, just as it was in FIG. 1, although that apparatus is not repeated in FIG. 8. The basic operation of the register-counters 10, 12, and 14 is the same in the system of FIG. 8 as in the system of FIG. 1 except that the counting clock pulses are supplied at the top of these register-counters at twice the frequency employed for this purpose in the system of FIG. 1. This is true, at least, if the same basic sample clock rate is selected — as postulated for FIG. 7 to provide a comparison with FIG. 6. Thus, the preferred counter rate in FIG. 8 is 4.8 MHz compared to 2.4 MHz for FIG. 1. When the basic clock pulse C1 (corresponding to clock pulse C in FIG. 1) is received on line 28, it sets flip-flop 26, providing an output on the output connection 204, and also starting the count down operation of the register-counters 10, 12, and 14. The output signal continues at connection 204 until the register-counters 10, 12, and 14 have completed their count down, at which time a signal is emitted from connection 34 of register-counter 10 to reset the flip-flop 26.

In the system of FIG. 8, the C1 sample clock pulse is also supplied through a branch circuit 28A to the set input of a flip-flop 206, thus causing the emission of an output on the output connection 208 of that flip-flop to an exclusive OR gate 210. Thus, during the count down operation of the registers 10, 12, and 14, inputs are available from both connections 204 and 208 to the exclusive OR gate 210. This results in a logic 0 output from that gate to an inverter 211. The result is a logic 1 signal to the upper input of a NAND gate 212, and a resultant logic 0 signal on the output pulse duration modulation (PDM) connection 24A. This assumes a logic 1 is available also on the lower input of gate 212, a condition that is fulfilled by the "set" condition of flip-flop 206 causing a logic 0 output on connection 238 to NAND gate 240. Following the rule of NAND gate operation, gate 240 must provide a logic 1 output in response to any 0 input.

Assuming that the register-counters 10, 12, 14 store the minimum count value of 125, the duration of the PDM logic 0 (no carrier output) interval will be as illustrated in FIG. 7 from the clock pulse C1 time at point 182A to the leading edge of the pulse 180A at point 214. At that time, the count down of counters 10, 12, 14 being completed, the flip-flop 26 is reset, the output on connection 204 goes to logic 0 and the outputs from exclusive OR 210 and NAND gate 212 consequently become logic 1 to gate on the carrier. This exact condition continues until the receipt of clock pulse C2 at point 198 in FIG. 7. In order to explain the operation of the system of FIG. 8 at time point 198, it is necessary to explain first the structure and operation of additional components.

The system of FIG. 8 includes an additional register-counter 216 which is arranged to count down, just as are the register-counters 10, 12, and 14, and which is wired in a fashion similar to the register-counter 14 to be loaded to store a fixed number by means of permanently wired input connections indicated at 218. In this preferred embodiment, the number stored corresponds to the total counter pulses (at 4.8 MHz) in the interval between successive C1 and C2 clock pulses, or 500. The loading of the number 500 from connections 218 into register-counter 216 occurs only once during each cycle of operation by means of a signal received on a load input L connection at 220 from a monostable multivibrator circuit (single shot circuit) 222. The single shot operates in response to a signal on connection 224 from the reset output of a flip-flop 226. The circuit is designed so that the counter 216 is always fully loaded at the time of the C1 clock pulse. When the flip-flop 26 is set, the set output is supplied on a branch circuit 204A to an OR gate 228. The resultant signal from OR gate 228 is supplied on a connection 230 to the enable E input of counter 216. Thus, counter 216 is caused to count down for the entire period during which the flip-flop 26 is set. This corresponds to the entire count down interval of the combination of register-counters 10, 12, and 14. Thus, register 216 counts down by the same number initially stored and counted down by the register-counters 10, 12, and 14. Accordingly, if the total number originally stored in registers 10, 12, 14 is 125, the number remaining in storage in the counter 216 after this count down operation will be 500 minus 125, or 375. Thus, the number remaining in register-counter 216 is the 500 complement of the number originally stored in register-counters 10, 12, and 14.

Upon the occurrence of the timing signal C2, that signal is supplied on a connection 232 to set the flip-flop 226, thus providing an output at connection 234, again operating the OR gate 228 to enable the continued count down of counter 216. The count down of the counter 216 continues for an interval corresponding to the "500 complement" value until that counter is completely emptied, at which time a signal is emitted at a counter output connection 236 connected to the reset input of flip-flop 226, causing the flip-flop to reset, thus disabling the counter 216 but providing a reload signal through the single shot circuit 222 and connection 220. Thus, the counter 216 is reloaded and ready for a new cycle of operation.

The timing signal C2 is provided through a branch circuit 232A to the reset input of flip-flop 206. 206 thus remains reset until the next C1 timing pulse. Flip-flop 26 also continues in the reset state until the next C1 pulse. Thus, the exclusive OR gate 210 receives two logic 0 inputs, resulting in a logic 1 on the upper input of NAND gate 212. Therefore, the PDM output of NAND gate 212 is determined entirely from gate 240 until the next C1 pulse. The reset logic 1 output from flip-flop 206 is supplied on connection 238 to NAND gate 240. The other input to NAND gate 240 is the logic 1 set output of flip-flop 226. Accordingly, during the period at and immediately after the receipt of the timing signal C2, logic 1 signals are supplied on both of the input connections of NAND gate 240. These signals result in a logic 0 output to the lower input of NAND gate 212. With this logic 0 input, the NAND gate 212 provides a logic 1 output on PDM connection 24A to maintain the carrier on. This condition continues for a period of time corresponding to the period indicated in FIG. 7 between points 198 and 244. The next occurrence is the completion of the count down by counter 216 and the resultant resetting of flip-flop 226. At that time, the signal from the set output of flip-flop 226 on connection 234A goes to logic 0 with the result that the output from NAND gate 240 goes to logic 1, and the NAND gate 212, having logic 1 signals on both inputs provides a logic 0 output at connection 24A so that the carrier is turned off. This corresponds, as mentioned before, to point 244 in FIG. 7.

The above mentioned condition continues until the time of the next C1 timing pulse at point 186A when the entire operation is repeated. Thus, flip-flops 26 and 206 are set and the coincidence of the two logic 1 inputs on connections 204 and 208 to exclusive OR circuit 210 continues a logic 0 output from that circuit which, inverted to a logic 1 by inverter 211 provides a logic 1 input to gate 212. Thus, the logic 0 output is continued at 24A until register-counters 10, 12, 14 again count down.

It will be seen from the above description that, referring to FIG. 7 and FIG. 8 together, the beginning of the carrier pulse is held off for the time interval from point 182A to point 214 by the count down of the register-counters 10, 12, and 14. At the same time, a 500 complement of the counts stored in register-counters 10, 12, and 14 is stored in the counter 216 by counting that counter down by the same amount from the 500 value. At the point in time indicated at point 214 in FIG. 7, the count is completed, the flip-flop 26 is reset, and the PDM signal controlling the carrier is no longer held off so that the carrier comes on. After the second clock timing signal C2, at point 198, the PDM signal and the carrier are maintained in the "on" condition while the 500 complement value stored in the counter 216 is counted out of that counter. At the end of that count, at point 244 on the FIG. 7 timing diagram, the PDM signal and the carrier are no longer held "on," and consequently they go off. This accounts for the interval from point 244 to point 186A in FIG. 7. The cycle is then repeated with the new count stored in the register-counters 10, 12, 14.

It is to be seen that there are two modes of operation of the circuit as determined by the set and reset conditions of flip-flop 206. When flip-flop 206 is in the set condition, the counting down of register-counters 10, 12, and 14, as detected by the set condition of flip-flop 26 holds off the PDM signal. However, when the flip-flop 206 is reset, then the count down of the counter 216, detected by the set condition of flip-flop 226, holds on the PDM signal. Each of these modes of operation contributes to the generation of one-half of the pulse of carrier signal, the two halves of the pulse being symmetrical about the C2 clock time, as shown in FIG. 7.

The explanation of the modification of FIG. 8 has been given entirely in terms of having the carrier switched on during periods which are symmetrical about the C2 sample points of FIG. 7. However, it is obvious that the PDM signal on connection 24A of FIG. 8 could be inverted so that the carrier signal would be turned off for periods which are symmetrical about the C2 sample points. The carrier signal would then be on during other time periods. Thus the output would be a simple inversion of the output illustrated in FIG. 7. Such inverted signals would be fully recognized by the receiver as pulse duration modulation signals.

While various components of the apparatus, such as the Morse code generator 48, the multiplier 54, and the adders 60 and 170, have not been shown and described in detail, it will be understood that conventional structures for these functions may be employed. For instance, the multiplier may be a conventional binary digital multiplier employing successive shifting and addition operations.

The detailed disclosure given above illustrates at least two methods of providing modulation signals used in combination. Thus, the modulating wave sample point generator 46 described in detail in FIG. 2 simply provides for obtaining various sample points of a modulating wave directly from a read-only memory, and interrupting the flow of sample points with a Morse code generator to thereby insert information in addition to the basic modulating wave. This signal is stored in the register counter 12. A variation on this method is disclosed in connection with the sample point generator 52 and the scale factor generator 44 and associated apparatus. Generator 52 is employed to obtain sample points for two different waves, the sample points being combined in proportions determined by scale factors obtained from scale factor generator 44 to provide a combination modulation signal as a number stored in register-counter 10. Either of these methods may be employed alone, or in combination as disclosed, for providing a modulation signal.

Furthermore, it is obviously possible to provide a larger sample point generator 52 which stores all of the desired combined sample points which are constantly computed and delivered from the adder 60 to the register-counter 10. This would permit elimination of the scale factor generator 44, the multiplier 54, and the associated elements including registers 56 and 58 and adder 60. However, it would not be possible with such an arrangement to change the scale factors without changing the entire memory. Furthermore, so many sample points would be required that the cost of the sample point generator with the enlarged memory capacity would be greater than the system as shown.

With the system as illustrated, it is necessary only to change the scale factors stored in the scale factor generator 44 in order to obtain a complete change in the pattern of the proportions of modulation provided by the two waves derived from the sample point generator 52. This makes for a very flexible system.

While this specification deals particularly with digitized methods of modulation in conjunction with switched scanning wave transmitters, it will be understood that the digitized method and apparatus for achieving modulation is not necessarily limited to scanning wave applications, or to switched scanning wave applications. This method and apparatus for modulation is just as effective with systems requiring only one fixed antenna. Furthermore while the preferred method of modulation, in accordance with the present invention, is pulse duration modulation in which the length of each pulse is determined by the combined counts stored in the register-counters 10, 12, and 14, it is apparent that the successive counts stored in those registers could be employed to accomplish modulation by other modes. For instance the stored sample value counts may be used as control signals for a variable attenuator to thereby modulate the carrier wave by variable attenuation to achieve an amplitude modulation effect. Similarly, the values stored in the registers 10, 12, and 14 could be employed to impart controllable variations in the phase shift of variable phase shift circuits to thereby achieve phase modulation. In each case, the modulation is determined by successive sample point values in accordance with the teachings of the present invention.

It is one of the most important features of the present invention that the circuit operation is completely digital in nature. Thus, the read-only memories operate in a digital fashion to store sample point values as digital numbers, the timing of the circuits is carried out in a digital fashion, and in the preferred form, the length of the bursts or pulses of carrier energy is ultimately determined on the basis of the digital numbers stored in the register-counters 10, 12, and 14. Thus, the tones representing the 90 and 150 Hz modulation signals, and the identification tone signals never actually exist in the transmitter. They are truly synthesized in the form of successively derived modulation numbers applied to the carrier to determine the length of successive carrier bursts. These tones therefore only exist in the perception of the receivers which recognize that the tone information is present. With this technique, the transmitter is uniquely and remarkably accurate in producing modulation. Both the absolute and relative modulation are extremely accurate.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

We claim:

1. A method for synthesizing the production of a modulated radio carrier wave comprising digitally storing a plurality of different sample point values signifying various modulation levels required at successive points in time, reading out said sample point values in timed sequence, applying said point values to modify a carrier wave in said timed sequence by gating the carrier wave on and off for periods determined by the sample point values to thereby establish a pulse duration modulated carrier signal, the intervals between said successive points in time being divided into a first timing interval and a second timing interval and the carrier wave being gated in a first sense starting with the beginning of the first timing interval and ending after a period less than the first timing interval and proportional to the stored sample point value, the carrier wave being switched in a second sense for the remainder of said first timing interval, the carrier wave then being maintained in the second sense during the first portion of the second timing interval for a period proportional to a count value which is a complement of said stored sample point value, the carrier then being switched to the first switched state for the remainder of the second timing interval.

2. A method as claimed in claim 1 wherein said first sense of carrier wave gating is on and said second sense of carrier wave gating is off.

3. A method as claimed in claim 1 wherein said first sense of carrier wave gating is off and said second sense of carrier wave gating is on.

4. A method for synthesizing the production of a modulated radio carrier wave comprising digitally storing a plurality of different sample point values signifying various modulation levels required at successive points in time to suggest the presence of a modulation signal wave form, reading out said sample point values in timed sequence, modifying the sample point values to insert coded signal information therein by imposing timed interruptions in the delivery of different sample point values, applying said modified point values to modify a carrier wave in said timed sequence to produce a modified carrier, the modifications of the carrier being such as to be recognized by a receiver as modulation by an interrupted repetitive wave form modulation signal.

5. A method for synthesizing the production of a modulated radio carrier wave comprising digitally storing a plurality of different sample point values signifying various modulation levels required at successive points in time, reading out said sample point values in timed sequence modifying the sample point values to insert additional signal information therein, applying said modified point values to modify a carrier wave in said timed sequence to produce a modified carrier, the modifications of the carrier being such as to be recognized as modulation by a receiver, the modification of the sample point values comprising the steps of storing and reading out a second plurality of different sample point values in step with the reading out of the first mentioned plurality of sample point values, storing and reading out a scale factor for each member of said first mentioned plurality of sample point values, multiplying each member of said first mentioned plurality of sample point values by the corresponding scale factor to form a first product, deriving a complement value for each scale factor, multiplying the corresponding member of the second plurality of sample point values by the derived complement value of the scale factor to form a second product, and then further modifying each first product by arithmetically adding thereto the corresponding second product.

6. A method as claimed in claim 5 wherein said first plurality of sample point values and said second plurality of sample point values respectively represent signal wave frequencies having a common period of repetition, and wherein said first plurality of sample point values and said second plurality of sample point values are read out in sequence over the entire common period of repetition, and then the operation is repeated to provide continuous modulation at the frequencies represented by said first and second pluralities of sample point values, the total number of sample points provided being no greater than those needed for one-half of the common period of repetition, the sample point values for the first half of each common period of repetition being provided by direct read-out of the sample point values, and the sample point values for the second half of each period of repetition being supplied by complement read-out of the sample point values.

7. A method as claimed in claim 6 wherein each of the one-half periods of repetition is again divided into two quarters of a period of repetition, the number of sample points provided in memory corresponding to those necessary only for one quarter of the common period of repetition, the sample point values for the first and third quarters being provided by reading out the successive sample values in direct order, and the sample values for the second and fourth quarters of the common period of repetition being provided by reading out the same sample point values in reverse order.

8. Apparatus for synthesizing the production of a modulated radio carrier wave comprising storage means for concurrently storing digital values corresponding to a plurality of different sample points signifying various modulation levels required at successive points in time to suggest the presence of a modulation signal wave form, means for reading out said sample point values in timed sequence, means for modifying the sample point values by interrupting the delivery of different sample point values for timed periods, a source of carrier waves, and means for applying said point values to modify the carrier waves to produce a modified carrier which is recognizable by a receiver as a carrier modulated by an interrupted repetitive wave form modulation signal.

9. Apparatus as claimed in claim 8 wherein there is provided a Morse code signal generator connected to control said interrupting means.

10. Apparatus for synthesizing the production of a modulated radio carrier wave comprising storage means for storing digital values corresponding to a first plurality of different sample points signifying functions of various modulation levels required at successive points in time, means for reading out said first sample point values in timed sequence, means for storing and reading out a second plurality of different sample point values in step with the reading out of the first plurality of sample point values, means for storing and reading out a scale factor for each of said first sample point values, a multiplying means operable for multiplying each of said first sample point values by the corresponding scale factor to derive a first product, means for deriving a complement value for each of said scale factors, means for multiplying each member of said second plurality of sample point values by a corresponding member of said scale factor complement values to derive a second product, adding means operable to add each first product to the corresponding second product to form a sum value, a source of carrier waves, and means for applying said sum values to modify the carrier waves to produce a modified carrier which is recognizable by a receiver as a modulated carrier.

11. Apparatus as claimed in claim 10 wherein said first mentioned plurality of sample point values are representative of a first signal tone frequency and said second plurality of sample point values are representative of a second signal tone frequency, the combination of said sum values being representative of a combination of said first and second signal tone frequencies in a phase-locked relationship, the apparatus including means for providing a third plurality of sample point values representative of a third signal tone, means for interrupting the delivery of different sample point values of said third plurality of sample point values for timed periods for the transmission of pulse coded information, and means for combining said third plurality of sample point values with said sum values for modification of the carrier waves.

12. Apparatus as claimed in claim 11 wherein said means for interrupting the delivery of different sample point values comprises a Morse code signal generator so that said pulse coded information is in Morse code.

13. Apparatus as claimed in claim 11 wherein there is provided a first register-counter operable during successive sample timing intervals for successively storing each of said sum values, a second register-counter operable during said successive sample timing intervals to store successively each member of said third plurality of sample point values, a third register-counter connected and arranged to store a fixed number during each sample point timing interval, said register-counters being connected and arranged to be counted down in sequence during each sample interval after initiation by a sample clock pulse, said means for modifying the carrier wave comprising a gating device connected for operation in response to the count down operation of said register-counters and being responsive to the combined counts therein, said gating device being operable to a first gating state during the count down operation of said register-counters and to a second gating state after the completion of said count down operation of said register-counters to thereby gate the carrier on and off for periods proportional to the sample point values as determined by the counting down periods of said register-counters to establish a pulse duration modulated carrier signal.

14. Apparatus for synthesizing the production of a modulated radio carrier wave comprising storage means for concurrently storing digital values corresponding to a plurality of different sample points signifying various modulation levels required at successive points in time to suggest the presence of a modulation signal wave form, means for reading out said sample point values in timed sequence comprising an address control device for determining the different sample point values to be read out, said address control device comprising a repetitively operable digital counter, a source of carrier waves, and means for applying said point values to modify the carrier waves to produce a modified carrier which is recognizable by a receiver as a carrier modulated by a repetitive wave form modulation signal.

15. Apparatus as claimed in claim 14 wherein the counter is operable to be successively counted up and then reversed to count down and then reversed to count up and the process is repeated again and again to successively read out sample point values in direct and reverse order to provide symmetrical combinations of sample point values on the up count and down count operations of the counter to thereby provide the sample point values indicative of a symmetrical repetitive modulation wave form.

16. Apparatus as claimed in claim 15 wherein there is provided a switching means for switching from direct value read out of said sample values to reciprocal value read out of said sample values, said switching means being operable to provide reciprocal value read out signals on every other set of sample value read outs during every other sequence of up and down counts by said counter so as to provide a full sequence of inverse sample point values.

* * * * *

PO-1050
(5/69)

UNITED STATES PATENT OFFICE
CERTIFICATE OF CORRECTION

Patent No. 3,808,558    Dated April 30, 1974

Inventor(s) DONALD J. TOMAN and J. ROLAND COULTER

It is certified that error appears in the above-identified patent and that said Letters Patent are hereby corrected as shown below:

Column 6, line 4, "as" should read --a--.
Column 7, line 13, "output" should read --input--.
Column 8, line 53, "of" should read --at--.
Column 13, line 63, "from" should read --for--.

Signed and sealed this 1st day of October 1974.

(SEAL)
Attest:

McCOY M. GIBSON JR.
Attesting Officer

C. MARSHALL DANN
Commissioner of Pate